(12) United States Patent
Wang et al.

(10) Patent No.: US 11,337,199 B2
(45) Date of Patent: May 17, 2022

(54) METHOD AND DEVICE FOR TRANSMITTING DOWNLINK CONTROL CHANNEL

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 123 days.

(21) Appl. No.: 16/637,753

(22) PCT Filed: Aug. 1, 2018

(86) PCT No.: PCT/CN2018/098164
§ 371 (c)(1),
(2) Date: Feb. 9, 2020

(87) PCT Pub. No.: WO2019/029421
PCT Pub. Date: Feb. 14, 2019

(65) Prior Publication Data
US 2020/0196284 A1 Jun. 18, 2020

(30) Foreign Application Priority Data
Aug. 9, 2017 (CN) .......................... 201710677550.0

(51) Int. Cl.
*H04W 72/04* (2009.01)

(52) U.S. Cl.
CPC ................................ *H04W 72/042* (2013.01)

(58) Field of Classification Search
CPC ... H04W 72/04; H04W 72/042; H04W 24/08; H04W 76/27; H04W 72/1273; H04W 72/1268
See application file for complete search history.

(56) References Cited

U.S. PATENT DOCUMENTS

2013/0286960 A1 10/2013 Li et al.
2018/0324843 A1* 11/2018 Lee ........................ H04L 5/0053
(Continued)

FOREIGN PATENT DOCUMENTS

| CN | 102404076 A | 4/2012 |
| CN | 102611524 A | 7/2012 |

(Continued)

OTHER PUBLICATIONS

Huawei, HiSilicon: "UE procedure of PDCCH monitoring for URLLC", 3GPP TSG RAN WG1 Ad hoc Meeting, R1-1709993, Qingdao, China, Jun. 27-30, 2017.
(Continued)

*Primary Examiner* — Chi Ho A Lee
(74) *Attorney, Agent, or Firm* — Kilpatrick Townsend & Stockton, LLP

(57) ABSTRACT

Disclosed are a method and device for transmitting a downlink control channel. The method comprises: a terminal receives configuration information sent by a base station device, the configuration information comprising control resource set (CORESET) group information or PDCCH candidate group information in at least one CORESET allocated by the base station device to the terminal in a downlink control channel monitoring occasion; when the configuration information comprises the CORESET group information, the terminal determines at least one group of CORESETs from the configuration information, and detects and receives at most one piece of DCI from each group of CORESETs in the at least one group of CORESETs accord- (Continued)

ing to a specific DCI format expected by the terminal; when the configuration information comprises the PDCCH candidate group information in the at least one CORESET, the terminal determines at least one group of PDCCH candidates from the configuration information, and detects and receives at most one piece of DCI from each group of PDCCH candidates in the at least one group of PDCCH candidates according to the specific DCI format expected by the terminal.

4 Claims, 3 Drawing Sheets

(56) References Cited

U.S. PATENT DOCUMENTS

| | | | | |
|---|---|---|---|---|
| 2019/0082427 A1* | 3/2019 | Kim | ............ | H04L 5/0051 |
| 2019/0357185 A1* | 11/2019 | Kwak | ............ | H04L 5/0094 |
| 2020/0008216 A1* | 1/2020 | Iyer | ............ | H04W 72/04 |
| 2020/0145130 A1* | 5/2020 | Shen | ............ | H04L 1/00 |
| 2020/0154467 A1* | 5/2020 | Gong | ............ | H04W 24/08 |
| 2020/0177306 A1* | 6/2020 | Choi | ............ | H04L 1/0072 |
| 2020/0205134 A1* | 6/2020 | Pan | ............ | H04L 5/0053 |
| 2020/0221428 A1* | 7/2020 | Moon | ............ | H04L 5/00 |

FOREIGN PATENT DOCUMENTS

| | | |
|---|---|---|
| CN | 103931254 A | 7/2014 |
| CN | 104350695 A | 2/2015 |
| CN | 106465374 A | 2/2017 |

OTHER PUBLICATIONS

ZTE: "NR PDCCH CORESET Configuration", 3GPP TSG RAN WG1 Meeting #AH_NR2, R1-1710106, Qingdao, China, Jun. 26-30, 2017.

Samsung,"Multi-beam Transmission for NR-PDCCH", 3GPP TSG RAN WG1 Meeting #89, Hangzhou, China, May 15-19, 2017, total 7 pages, R1-1707987.

ZTE,"Supporting Muiti-beam in NR-PDCCH", 3GPP TSG RAN WG1 NR Ad-Hoc#2, Qingdao, China, Jun. 27-30, 2017, total 6 pages, R1 -1710108.

Ericsson, "Summary of E-Mail Discussions on Downlink Control Signaling", 3GPP, TSG-RAN WG1 #87, R1-1612908, Nov. 18, 2016.

* cited by examiner

METHOD AND DEVICE FOR TRANSMITTING DOWNLINK CONTROL CHANNEL

The present application is a National Stage of International Application No. PCT/CN2018/098164, filed Aug. 1, 2018, which claims the priority of the Chinese Patent Application entitled Method and Device for Transmitting Downlink Control Channel, submitted to the Patent Office of China on Aug. 9, 2017, with the application number being 201710677550.0, and all the contents of which are incorporated herein by reference.

FIELD

The present disclosure relates to the technical field of communication, in particular to a method and device for transmitting a downlink control channel.

BACKGROUND

In a long term evolution (LTE) system, a terminal monitors a downlink control channel in a public search space and/or a UE-specific search space in accordance with the downlink control information (DCI) format expected to be received. After receiving the expected DCI format, the terminal does not continue to blindly detect the expected DCI format.

However, in a future wireless mobile communication system, a base station may allocate one or more control resource sets (CORESET) for the terminal in a slot or a subframe, especially to enhance the sending reliability of the base station, the base station may be necessary to send the DCI format with the same information on different beams, or send the same DCI format with different scheduling information on different beams, and different beams may correspond to different CORESETs. But there is currently no clear method on how the terminal detects and receives the downlink control channel in one or more allocated CORESETs.

SUMMARY

The embodiments of the present disclosure provide a method and device for transmitting a downlink control channel, which are used for solving the technical problem of how a terminal detects and receives a downlink control channel in one or more allocated CORESETs.

To this end, the method for transmitting a downlink control channel according to embodiments of the present disclosure specifically includes the following steps:

receiving, by a terminal, configuration information sent by a base station, wherein the configuration information includes control resource set (CORESET) group information or PDCCH candidate group information in at least one CORESET allocated by the base station to the terminal in a downlink control channel monitoring occasion;

determining, by the terminal, at least one group of CORESETs from the configuration information, and detecting and receiving at most one piece of DCI from each group of CORESETs in the at least one group of CORESETs according to a specific DCI format expected by the terminal, when the configuration information includes the CORESET group information; and determining, by the terminal, at least one group of PDCCH candidates from the configuration information, and detecting and receiving at most one piece of DCI from each group of PDCCH candidates in the at least one group of PDCCH candidates according to the specific DCI format expected by the terminal, when the configuration information includes the PDCCH candidate group information in the at least one CORESET.

Optionally, each group of CORESETs includes at least one CORESET.

Optionally, each group of PDCCH candidates includes at least one PDCCH candidate.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering all the PDCCH candidates in each CORESET and grouping numbered PDCCH candidates according to a preset grouping rule.

In a second aspect, the embodiments of the present disclosure further provide another method for transmitting a downlink control channel, which includes the steps:

sending, by a base station, configuration information to a terminal, wherein the configuration information includes control resource set (CORESET) group information or PDCCH candidate group information in at least one CORESET allocated by the base station to the terminal in a downlink control channel monitoring occasion, so that when the configuration information includes the CORESET group information, the terminal determines at least one group of CORESETs from the configuration information, and detects and receives at most one piece of DCI from each group of CORESETs in the at least one group of CORESETs according to a specific DCI format expected by the terminal; and when the configuration information includes the PDCCH candidate group information in the at least one CORESET, the terminal determines at least one group of PDCCH candidates from the configuration information, and detects and receives at most one piece of DCI from each group of PDCCH candidates in the at least one group of PDCCH candidates according to the specific DCI format expected by the terminal.

Optionally, each group of CORESETs includes at least one CORESET, and the base station sends at most one piece of DCI in each group of CORESETs in a monitoring occasion according to a specific DCI format.

Optionally, when each group of CORESETs includes multiple CORESETs, independently deploying, by the base station, configuration parameters of the multiple CORESETs or uniformly deploying, by the base station, the configuration parameters of the multiple CORESETs.

Optionally, each group of PDCCH candidates includes at least one PDCCH candidate, and the base station sends at most one piece of DCI in each group of PDCCH candidates in a monitoring occasion according to a specific DCI format.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering all the PDCCH candidates in each CORESET and grouping numbered PDCCH candidates according to a preset grouping rule.

In another aspect, the embodiments of the present disclosure further provide a terminal which includes:

a receiving module configured to receive configuration information sent by a base station, wherein the configuration information includes control resource set (CORESET) group information or PDCCH candidate group information in at least one CORESET allocated by the base station to the terminal in a downlink control channel monitoring occasion;

a first determining module configured to determine at least one group of CORESETs from the configuration information, and detect and receive at most one piece of DCI from each group of CORESETs in the at least one group of CORESETs according to a specific DCI format expected by the terminal when the configuration information includes the CORESET group information; and the first determining module is configured to determine at least one group of PDCCH candidates from the configuration information, and detect and receive at most one piece of DCI from each group of PDCCH candidates in the at least one group of PDCCH candidates according to the specific DCI format expected by the terminal when the configuration information includes the PDCCH candidate group information in the at least one CORESET.

Optionally, each group of CORESETs includes at least one CORESET.

Optionally, each group of PDCCH candidates includes at least one PDCCH candidate.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering all the PDCCH candidates in each CORESET and grouping numbered PDCCH candidates according to a preset grouping rule.

In another aspect, the embodiments of the present disclosure further provide a base station which includes:

a sending module configured to send configuration information to a terminal, wherein the configuration information includes control resource set (CORESET) group information or PDCCH candidate group information in at least one CORESET allocated by the base station to the terminal during a downlink control channel monitoring occasion, so that when the configuration information includes the CORESET group information, the terminal determines at least one group of CORESETs from the configuration information, and detects and receives at most one piece of DCI from each group of CORESETs in the at least one group of CORESETs according to a specific DCI format expected by the terminal; and when the configuration information includes the PDCCH candidate group information in the at least one CORESET, the terminal determines at least one group of PDCCH candidates from the configuration information, and detects and receives at most one piece of DCI from each group of PDCCH candidates in the at least one group of PDCCH candidates according to the specific DCI format expected by the terminal.

Optionally, when each group of CORESETs includes at least one CORESET, the base station includes:

a first sending submodule configured to send at most one piece of DCI in each group of CORESETs in a monitoring occasion according to a specific DCI format.

Optionally, when each group of CORESETs includes multiple CORESETs, the base station includes:

a configuration module configured to independently deploy configuration parameters of the multiple CORESETs or uniformly deploy configuration parameters of the multiple CORESETs.

Optionally, when each group of PDCCH candidates includes at least one PDCCH candidate, the base station includes:

a second sending submodule configured to send at most one piece of DCI in each group of PDCCH candidates in a monitoring occasion according to a specific DCI format.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering all the PDCCH candidates in each CORESET and grouping numbered PDCCH candidates according to a preset grouping rule.

Through the technical solution of the embodiments of the present disclosure, the base station allocates the terminal with one or more CORESET groups in a downlink control channel monitoring occasion or allocates the terminal with at least one PDCCH candidate group in one or more CORESETs, so that the terminal can detect and receive one piece of DCI with the specific DCI format in the received one or more CORESET groups, or at least one PDCCH candidate group in at least one CORESET, thus, the technical problem of how the terminal detects and receives the downlink control channel in one or more allocated CORESETs is solved, and a method for effectively detecting and receiving a downlink control channel is provided for the terminal.

BRIEF DESCRIPTION OF THE DRAWINGS

In order to more clearly explain the embodiments of the present disclosure or the technical solutions in the prior art, the drawings adopted for the description of the embodiments will be briefly introduced below. Obviously, the drawings in the following description are only some embodiments of the present disclosure.

DETAILED DESCRIPTION OF THE EMBODIMENTS

In order to make the objectives, technical solutions and advantages of the embodiments of the present disclosure clearer, the technical solutions in the embodiments of the present disclosure will be clearly and completely described with reference to the accompanying drawings in the embodiments of the present disclosure. Obviously, the described embodiments are a part, but not all, of the embodiments of the present disclosure. Based on the embodiments of the present disclosure, all other embodiments obtained by those of ordinary skill in the art without creative efforts shall fall within the protection scope of the present disclosure.

It should be understood that the technical solutions of the present disclosure can be applied to various communication systems, such as global mobile communication (GSM) systems, code division multiple access (CDMA) systems, wideband code division multiple access (WCDMA) systems, general packet radio service (GPRS), long term evolution (LTE) systems, advanced long term evolution (LTE-A) systems, universal mobile telecommunication systems (UMTS) and new radio (NR).

It should also be understood that in the embodiments of the present disclosure, user equipment (UE) includes, but is not limited to, a mobile station (MS), a mobile terminal, a mobile telephone, a handset and portable equipment, and the user equipment can communicate with one or more core networks via a radio access network (RAN). For example, the user equipment can be a mobile phone (or cellular telephone), a computer with wireless communication functions and other devices. The user equipment may also be a portable, pocket-sized, handheld, computer built-in or vehicle-mounted mobile device.

In the embodiments of the present disclosure, a base station (for example, an access point) may refer to a device communicating with a wireless terminal through one or more sectors on an air interface in an access network. The base station can be used for converting received air frames and IP packets and act as a router between the wireless terminal and the rest of the access network, wherein the rest of the access network can include an internet protocol (IP) network. The base station can also coordinate attribute management of the air interface. For example, the base station can be a base transceiver station (BTS) in GSM or CDMA, or a NodeB in TD-SCDMA or WCDMA, or an evolutional NodeB (eNodeB or eNB or e-NodeB), or a gNB in 5G NR, which is not limited herein.

Figure 1:
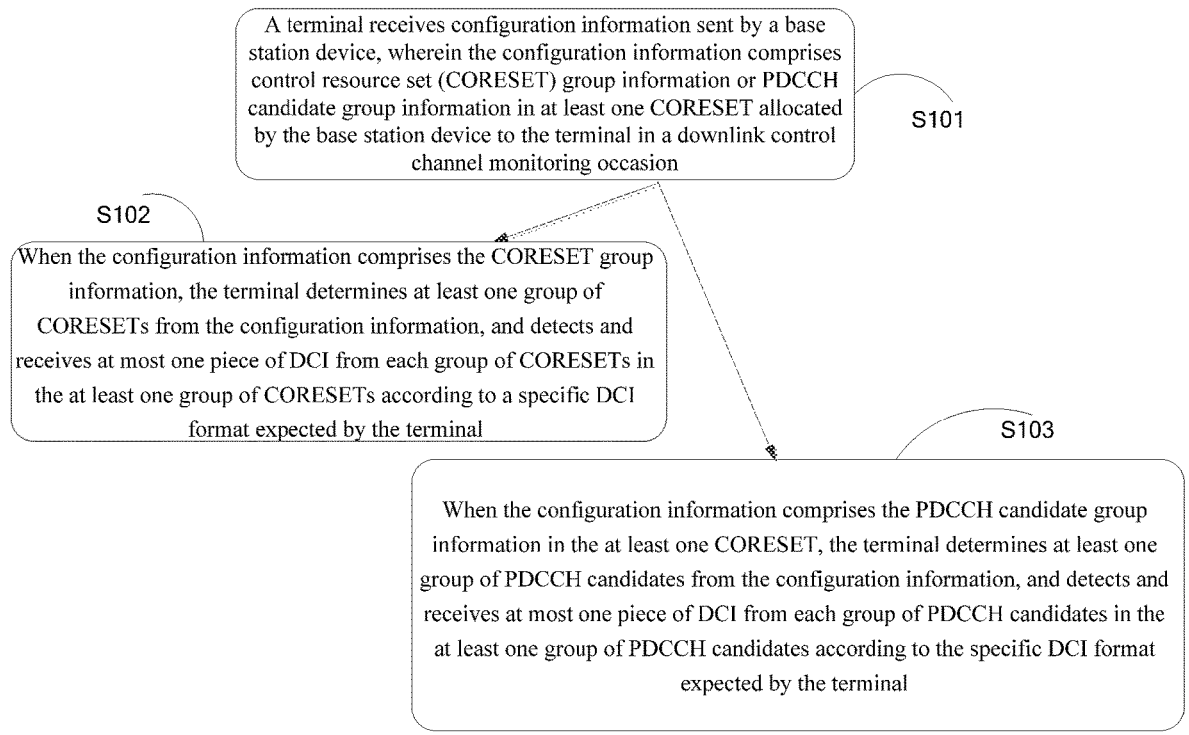
FIG. 1 is a flow diagram of a method for transmitting downlink control channel according to embodiments of the present disclosure.

Referring to FIG. 1, a method for transmitting a downlink control channel according to the embodiments of the present disclosure includes:

Step S101: A terminal receives configuration information sent by a base station device, the configuration information includes control resource set (CORESET) group information or PDCCH candidate group information in at least one CORESET allocated by the base station device to the terminal in a downlink control channel monitoring occasion;

Step S102: When the configuration information includes the CORESET group information, the terminal determines at least one group of CORESETs from the configuration information, and detects and receives at most one piece of DCI from each group of CORESETs in the at least one group of CORESETs according to a specific DCI format expected by the terminal; and Step S103: When the configuration information includes the PDCCH candidate group information in the at least one CORESET, the terminal determines at least one group of PDCCH candidates from the configuration information, and detects and receives at most one piece of DCI from each group of PDCCH candidates in the at least one group of PDCCH candidates according to the specific DCI format expected by the terminal.

During actual application, according to the embodiments of the present disclosure, step S101 is performed at first, that is, a terminal receives configuration information sent by a base station device, wherein the configuration information includes control resource set (CORESET) group information or PDCCH candidate group information in at least one CORESET allocated by the base station device to the terminal in a downlink control channel monitoring occasion.

In the embodiment, the monitoring occasion of the downlink control channel is a continuous time resource of a terminal for detecting and receiving the downlink control channel within a transmission time interval (TTI). In the specific practice process, the base station can send configuration information to the terminal through high-level signaling. The configuration information may include control resource set (CORESET) group information allocated by the base station to the terminal in a downlink control channel monitoring occasion, or physical downlink control channel (PDCCH) candidate group information in at least one CORESET allocated by the base station to the terminal in a downlink control channel monitoring occasion. Then, after the base station sends the configuration information to the terminal, the terminal can receive the configuration information.

Specifically, when the configuration information includes the control resource set (CORESET) group information allocated by the base station to the terminal in a downlink control channel monitoring occasion, after step S101 is performed in the embodiment of the present disclosure, step S102 is performed, that is, when the configuration information includes the CORESET group information, the terminal determines at least one group of CORESETs from the configuration information, and detects and receives at most one piece of DCI from each group of CORESETs in the at least one group of CORESETs according to a specific DCI format expected by the terminal.

During practical application, the base station can allocate at least one group of CORESETs to the terminal in a downlink control channel monitoring occasion, and the base station sends at most one piece of DCI in each group of CORESETs in the allocated at least one group of CORESETs according to a specific DCI format, for example, when a group of CORESETs is allocated, the base station may send one piece of DCI according to a specific DCI format in the group of CORESETs, or may also send one piece of DCI according to a specific DCI format X and one piece of DCI according to a specific DCI format Y in the group of CORESETs, or may not send DCI in the group of CORESETs; when two groups of CORESETs are allocated, the base station may send one piece of DCI according to a specific DCI format in each group of CORESETs of the two groups of CORESETs, or may not send one piece of DCI in one group of CORESETs in the two groups of CORESETs and may send one piece of DCI according to a specific DCI format in the other group of CORESETs, or may not send one piece of DCI in each group of CORESETs of the two groups of CORESETs.

Specifically, when a base station allocates a group of CORESETs to a terminal in a downlink control channel monitoring occasion, and the base station sends one piece of DCI in accordance with a DCI format X in the group of CORESETs, the CORESET group information includes the group of CORESETs, and then the terminal can determine the group of CORESETs from the CORESET group information contained in the received configuration information.

During practical applications, one or more CORESETs may be contained in the group of CORESETs. When multiple CORESETs are contained in the group of CORESETs, for example, two CORESETs are contained in the group of CORESETs, the configuration parameters of the two CORESETs in the group of CORESETs may be uniformly deployed by the base station to be the same, for instant, the two CORESETs are identical in resource mapping mode or correspond to the same beam direction. Of course, the configuration parameters of the two CORESETs in the group of CORESETs may be independently deployed by the base station to be different, for instant, the two CORESETs are different in resource mapping mode or correspond to different beam directions, which is not limited herein.

In this embodiment, the group of CORESETs including one CORESET is taken as an example. Then, after the terminal determines the group of CORESETs from the CORESET group information contained in the received configuration information, the terminal can detect DCI from the group of CORESETs according to a specific DCI format expected by the terminal. Here it is assumed that the specific DCI format expected by the terminal is DCI format X, then the terminal detects the DCI in the group of CORESETs according to the DCI format X expected by the terminal, and thus the terminal can successfully detect that one piece of DCI is received.

Figure 2:
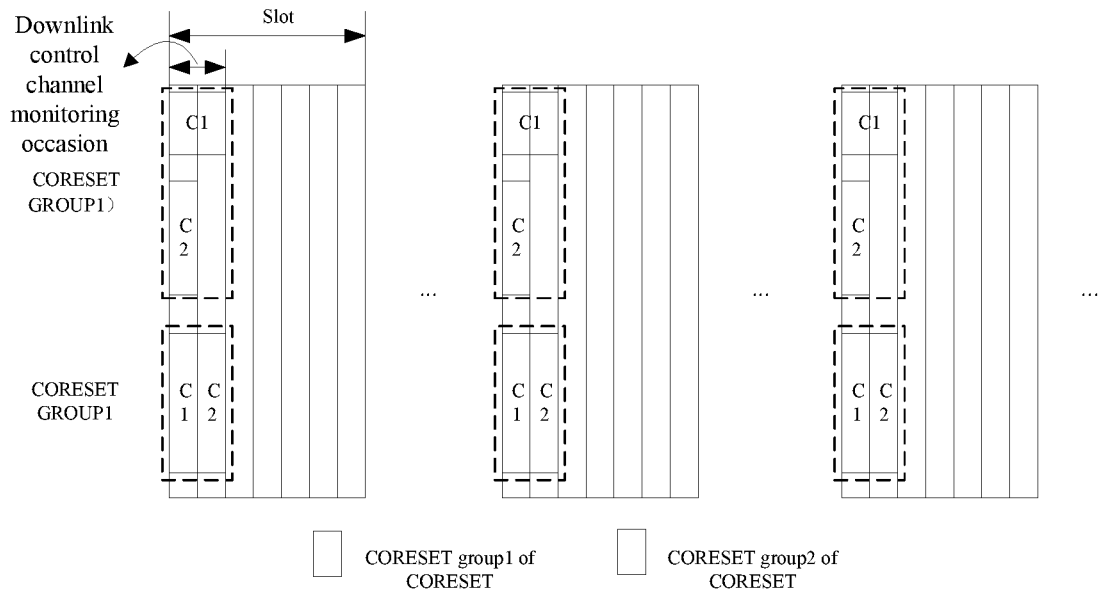
FIG. 2 is a schematic structural diagram of a transmission mode including two groups of CORESETs in embodiments of the present disclosure.

Specifically, when the base station allocates two groups of CORESETs to the terminal in a downlink control channel monitoring occasion, for convenience of description, one group of CORESETs in the two groups of CORESETs is called a first group of CORESETs, and the other group of CORESETs is called a second group of CORESETs. Referring to FIG. 2, CORESET GROUP1 indicates the first group of CORESETs, and CORESET GROUP2 indicates the second group of CORESETs. Then, the base station may send one piece of DCI in the first group of CORESETs according to a DCI format X, and send one piece of DCI in the second group of CORESETs according to a DCI format Y; the base station may also send one piece of DCI according to a DCI format X and one piece of DCI according to a DCI format Y in the first group of CORESETs, but not send DCI in the second group; and the base station may also send one piece of DCI in the first group of CORESETs according to a DCI format X, one piece of DCI in the second group of CORESETs according to a DCI format Y, one piece of DCI according to a DCI format Z, one piece of DCI according to a DCI format M, and so on, which are not listed one by one.

Then, after the base station allocates the first group of CORESETs and the second group of CORESETs to the terminal in a downlink control channel monitoring occasion, the CORESET group information received by the terminal includes the two groups of CORESETs, and the terminal can determine the first group of CORESETs and the second group of CORESETs from the CORESET group information contained in the received configuration information.

During practical application, the number of CORESETs included in the first group of CORESETs and the second group of CORESETs may be the same or different, for example, the first group of CORESETs and the second group of CORESETs each include one CORESET or three CORESETs, or the first group of CORESETs includes one CORESET and the second group includes two CORESETs, specifically, the first group of CORESETs shown in FIG. 2 includes two CORESETs, that is, CORESET GROUP1 corresponds to C1 and C2 in the dashed box in FIG. 2, the second group of CORESET also includes two CORESETs in FIG. 2, and CORESET GROUP2 corresponds to C1 and C2 in the dashed box, for example.

If the specific DCI format expected by the terminal is DCI format X, then the terminal can detect DCI according to the DCI format X in the first group of CORESETs, and also detect DCI according to the DCI format X in the second group of CORESETs. It is assumed that the base station sends one piece of DCI in the first group of CORESETs in accordance with the DCI format X, and the base station sends one piece of DCI in the second group of CORESETs according to the DCI format X. Then, the terminal can receive one piece of required DCI when detecting DCI according to the DCI format X in the first group of CORESETs, and after the terminal detects DCI according to the DCI format X in the first group of CORESETs and receives one piece of DCI, the terminal unnecessarily continues to detect and receive other pieces of DCI in accordance with the DCI format X in the first group of CORESETs. Similarly, the terminal can also receive one piece of required DCI when detecting DCI according to the DCI format X in the second group of CORESETs, and after the terminal detects DCI according to the DCI format X in the second group of CORESETs and receives one piece of DCI, the terminal unnecessarily continues to detect and receive other pieces of DCI in accordance with the DCI format X in the second group of CORESETs.

If the specific DCI format expected by the terminal is DCI format X and DCI format Y, then the terminal can detect and receive DCI according to the DCI format X and the DCI format Y in the first group of CORESETs, and detect and receive DCI according to the DCI format X and the DCI format Y in the second group of CORESETs. It is assumed that the base station sends one piece of DCI in accordance with the DCI format X in the first group of CORESETs, then the terminal can receive one piece of required DCI when detecting DCI in accordance with the DCI format X in the first group of CORESETs, and after the terminal detects DCI according to the DCI format X in the first group of CORESET and receives one piece of DCI, the terminal unnecessarily continues to detect and receive other pieces of DCI in accordance with the DCI format X in the first group of CORESETs.

Since the base station sends one piece of DCI according to the DCI format X in the first group of CORESETs, the terminal will not receive DCI when detecting DCI in the first group of CORESETs according to the DCI format Y. In other words, after the terminal blindly detects the downlink control channel according to the DCI format Y in the first group of CORESETs for the maximum times of blind detections, the terminal does not continue to blindly detect the downlink control channel according to the DCI format Y in the CORESET group.

Meanwhile, it is assumed that the base station sends one piece of DCI according to the DCI format Y in the second group of CORESETs, the terminal can receive one piece of required DCI when detecting DCI in the second group of CORESETs according to the DCI format Y, and does not continue to blindly detect the downlink control channel according to the DCI format X in the CORESET group after blindly detecting the downlink control channel according to the DCI format X for the maximum times of blind detections.

Specifically, when the configuration information includes PDCCH candidate group information in at least one CORESET allocated by the base station to the terminal during a downlink control channel monitoring occasion, after step S101 is performed, step S103 is performed in the embodiment of the present disclosure, that is, when the configuration information includes PDCCH candidate group information in the at least one CORESET, the terminal determines at least one group of PDCCH candidates from the configuration information, detects and receives at most one piece of DCI from each group of PDCCH candidates in the at least one group of PDCCH candidates according to the specific DCI format expected by the terminal.

In practical applications, the configuration information sent by the base station to the terminal may include PDCCH candidate group information in one CORESET, or may include PDCCH candidate group information in multiple CORESETs. For example, when the configuration information sent by the base station to the terminal includes PDCCH candidate group information in one CORESET, the CORESET can include a group of PDCCH candidates or multiple groups of PDCCH candidates, and one or more PDCCH candidates may be contained in each group of PDCCH candidates; similarly, when the configuration information sent by the base station to the terminal includes PDCCH candidate group information in multiple CORESETs, each CORESET of the multiple CORESETs may include a group of PDCCH candidates or multiple groups of PDCCH candidates, and one or more PDCCH candidates may be contained in each group of PDCCH candidates.

Specifically, when the configuration information sent by the base station to the terminal includes PDCCH candidate group information in one CORESET, the CORESET includes a group of PDCCH candidates, and the group of PDCCH candidates includes one PDCCH candidate, the base station may send one piece of DCI according to a specific DCI format in the group of PDCCH candidates, or send one piece of DCI according to the DCI format X and one piece of DCI according to the DCI format Y in the group of PDCCH candidates, or does not send DCI in the group of PDCCH candidates, which are not listed one by one.

In the embodiment, after receiving the sent configuration information, the terminal can determine the group of PDCCH candidates from the configuration information. It is assumed that the specific DCI format expected by the terminal is DCI format X, then, the terminal can detect DCI in the group of PDCCH candidates according to the DCI format X. It is assumed here that the base station sends one piece of DCI in accordance with the DCI format X in the group of PDCCH candidates, therefore, the terminal can receive one piece of required DCI when detecting DCI according to the DCI format X in the group of PDCCH candidates.

Specifically, when the configuration information sent by the base station to the terminal includes PDCCH candidate group information in one CORESET, and the CORESET includes two groups of PDCCH candidates, for convenience of description, the two groups of PDCCH candidates are referred to as the first group of PDCCH candidates and the second group of PDCCH candidates, then the first group of PDCCH candidates and the second group of PDCCH candidates may include the same number of PDCCH candidates, or may include different numbers of PDCCH candidates. Meanwhile, the first group of PDCCH candidates and the second group of PDCCH candidates can be obtained by grouping in one of the following ways.

The first grouping way:
the multiple groups of PDCCH candidates are obtained by grouping according to the aggregation level A1.

That is, the first group of PDCCH candidates and the second group of PDCCH candidates can be obtained by grouping PDCCH candidates of different Als (aggregation level). It is assumed here that the numbers of PDCCH candidates of different Als are shown in Table 1. Then, the base station can divide the PDCCH candidates with AL=1 and AL=4 into the first group of PDCCH candidates, and the base station can divide the PDCCH candidates with AL=2 and AL=8 into the second group of PDCCH candidates.

Then, the first group of PDCCH candidates includes eight PDCCH candidates, and the eight PDCCH candidates include six PDCCH candidates with AL=1 and two PDCCH candidates with AL=4. The second group of PDCCH candidates also includes eight PDCCH candidates, and the eight PDCCH candidates include six PDCCH candidates with AL=2 and two PDCCH candidates with AL=8. Certainly, the base station can also divide the PDCCH candidates with AL=1, AL=2 and AL=4 into the first group of PDCCH candidates and divide the PDCCH candidates with AL=8 into the second group of PDCCH candidates, and so on, which are not listed here one by one.

TABLE 1

| AL(aggregation level) | Number of PDCCH candidates |
| --- | --- |
| 1 | 6 |
| 2 | 6 |
| 4 | 2 |
| 8 | 2 |

The second grouping way:
the multiple groups of PDCCH candidates of each CORESET are obtained by numbering and then grouping all the PDCCH candidates in each CORESET according to a preset grouping rule.

It is assumed here that all PDCCH candidates in each CORESET are as shown in Table 1, that is, the PDCCH candidates include 6 PDCCH candidates of AL=1, 6 PDCCH candidates of AL=2, 2 PDCCH candidates of AL=4 and 2 PDCCH candidates of AL=8, namely 16 PDCCH candidates in total.

Thus the base station may number the 16 PDCCH candidates. For example, the 16 PDCCH candidates are sequentially numbered 1st, 2nd, 3rd, 4th, 5th, 6th, 7th, 8th, 9th, 10th, 11th, 12th, 13th, 14th, 15th and 16th, the base station can classify the 1st to 8th PDCCH candidates as the first group of PDCCH candidates, and the 9th to 16th PDCCH candidates as a second group of PDCCH candidates, the base station may also classify odd-numbered PDCCH candidates as the first group of PDCCH candidates and even-numbered PDCCH candidates as the second group of PDCCH candidates, and so on, which are not listed here one by one.

In the embodiment, the first group of PDCCH candidates and the second group of PDCCH candidates are specifically obtained by grouping according to the first grouping method. Thus the base station can send one piece of DCI according to a specific DCI format in the first group of PDCCH candidates or the second group of PDCCH candidates; the base station may also send one piece of DCI according to the DCI format X and one piece of DCI according to the DCI format Y in the first group of PDCCH candidates, and one piece of DCI according to the DCI format M and one piece of DCI according to the DCI format N in the second group of PDCCH candidates; the base station may not send DCI in the first group of PDCCH candidates, and send one piece of DCI according to the DCI format X in the second group of PDCCH candidates, and so on, which are not listed here one by one.

In the embodiment, when the configuration information sent by the base station to the terminal includes PDCCH candidate group information in a CORESET, and the CORESET includes the first group of PDCCH candidates and the second group of PDCCH candidates, the terminal may determine the first group of PDCCH candidates and the second group of PDCCH candidates from the configuration information after receiving the sent configuration information.

If the specific DCI format expected by the terminal is DCI format X and DCI format Y, then after receiving the sent configuration information, the terminal can detect and receive DCI in the first group of PDCCH candidates according to the DCI format X and DCI format Y, and detect and receive DCI in the second group of PDCCH candidates according to the DCI format X and DCI format Y.

It is assumed here that the base station sends one piece of DCI according to the DCI format X and one piece of DCI according to the DCI format Y in the first group of PDCCH candidates, and sends one piece of DCI according to the DCI format X and one piece of DCI according to the DCI format Y in the second group of PDCCH candidates.

The terminal may receive one piece of required DCI when detecting DCI according to the DCI format X in the first group of PDCCH candidates, and may also receive one piece of required DCI when detecting DCI according to the DCI format Y in the first group of PDCCH candidates. Similarly, the terminal may receive one piece of required DCI when detecting DCI according to the DCI format X in the second group of PDCCH candidates, and may also receive one piece of required DCI when detecting DCI according to the DCI format Y in the second group of PDCCH candidates.

Specifically, when the configuration information sent by the base station to the terminal includes PDCCH candidate group information in two CORESETs, the number of groups of PDCCH candidates contained in the two CORESETs may be the same or different. For example, the first CORESET includes a group of PDCCH candidates, and the second CORESET includes five groups of PDCCH candidates; or the first CORESET and the second CORESET each include two groups of PDCCH candidates.

It is assumed here that the first CORESET includes a group of PDCCH candidates, and the second CORESET includes a first group of PDCCH candidates and a second group of PDCCH candidates. Similarly, the PDCCH candidate group in the first CORESET may include a PDCCH candidate, or may include multiple PDCCH candidates, the first group of PDCCH candidates and the second group of PDCCH candidates in the second CORESET may include a PDCCH candidate or multiple PDCCH candidates, and the number of PDCCH candidates in the first group of PDCCH candidates and the number of PDCCH candidates in the second group of PDCCH candidates may be the same or different.

In the second CORESET, the first group of PDCCH candidates and the second group of PDCCH candidates may be obtained by grouping according to the first grouping method of the PDCCH candidates, and the first group of PDCCH candidates and the second group of PDCCH candidates may be obtained by grouping according to the second grouping method of the PDCCH candidates, which are not repeated and limited herein.

Then after receiving the sent configuration information, the terminal can determine a group of PDCCH candidates in the first CORESET, and a first group of PDCCH candidates and a second group of PDCCH candidates in the second CORESET from the configuration information. If the specific DCI format expected by the terminal is DCI format X and DCI format Y, the terminal may detect DCI in the group of PDCCH candidates in the first CORESET according to the DCI format X and DCI format Y, and detect DCI in the first group of PDCCH candidates and the second group of PDCCH candidates in the second CORESET according to the DCI format X and DCI format Y.

It is assumed here that the base station sends one piece of DCI according to the specific DCI format X in the group of PDCCH candidates of the first CORESET, the terminal may receive one piece of required DCI when detecting the DCI according to the DCI format X in the group of PDCCH candidates of the first CORESET, and after the terminal blindly detects the downlink control channel according to the DCI format Y for the maximum times of blind detections, the terminal does not continue to blindly detect the downlink control channel according to the DCI format Y in the group of PDCCH candidates.

It is assumed that the base station sends one piece of DCI according to the DCI format X in the first group of PDCCH candidates in the second CORESET, and sends one piece of DCI according to the DCI format X in the second group of PDCCH candidates in the second CORESET, the terminal may receive one piece of required DCI when detecting the DCI according to the DCI format X in the first group of PDCCH candidates in the second CORESET, and may receive one piece of required DCI when detecting the DCI according to the DCI format X in the second group of PDCCH candidates in the second CORESET.

Therefore, in the embodiments of the present disclosure, through the method, the base station is used for allocating one or more CORESET groups to the terminal in a downlink control channel monitoring occasion or allocating at least one group of PDCCH candidates in one or more CORESETs to the terminal, thus, the terminal may detect and receive one piece of DCI with a specific DCI format according to the specific DCI format expected by the terminal when receiving one or more CORESET groups or at least one PDCCH candidate group in at least one CORESET, then the technical problem of how the terminal detects and receives a downlink control channel in one or more allocated CORESETs is solved, and a method of effectively detecting and receiving the downlink control channel is provided for the terminal.

Based on the same inventive concept, the embodiments of the present disclosure provide another method for transmitting a downlink control channel. Another method for transmitting the downlink control channel is applied to a base station device side. For specific implementation of the method, refer to the foregoing description of the embodiments of the method applied to a terminal side, and no detailed description is repeated here. The method includes:

a base station device sends configuration information to a terminal, wherein the configuration information includes control resource set (CORESET) group information or PDCCH candidate group information in at least one CORESET allocated by the base station device to the terminal in a downlink control channel monitoring occasion;

thus when the configuration information includes the CORESET group information, the terminal can determine at least one group of CORESETs from the configuration information, and can detect and receive at most one piece of DCI from each group of CORESETs in the at least one group of CORESETs according to a specific DCI format expected by the terminal; and when the configuration information includes the PDCCH candidate group information in the at least one CORESET, the terminal can determine at least one group of PDCCH candidates from the configuration information, and can detect and receive at most one piece of DCI from each group of PDCCH candidates in the at least one group of PDCCH candidates according to the specific DCI format expected by the terminal.

Optionally, each group of CORESETs includes at least one CORESET, and the base station device sends at most one piece of DCI in each group of CORESETs in a monitoring occasion according to a specific DCI format.

Optionally, when each group of CORESETs includes multiple CORESETs, the base station device independently deploys configuration parameters of the multiple CORESETs or the base station device uniformly deploys configuration parameters of the multiple CORESETs.

Optionally, each group of PDCCH candidates includes at least one PDCCH candidate, and the base station device sends at most one piece of DCI in each group of PDCCH candidates in a monitoring occasion according to a specific DCI format.

Optionally, when each CORESET in the at least one CORESET includes multiple groups of PDCCH candidates, the multiple groups of PDCCH candidates are obtained by grouping according to an aggregation level A1.

Optionally, when each of the CORESETs in the at least one CORESET includes multiple groups of PDCCH candidates, the multiple groups of PDCCH candidates of each CORESET are obtained by numbering and then grouping all the PDCCH candidates in each CORESET according to a preset grouping rule.

Based on the same inventive concept, the embodiments of the present disclosure provide a terminal. For specific implementation of the method for transmitting a downlink control channel of the terminal, refer to the foregoing description of the embodiments of the above method, and no detailed description is repeated here. The terminal mainly includes:

a receiving module configured to receive configuration information sent by a base station device, wherein the configuration information includes control resource set (CORESET) group information or PDCCH candidate group information in at least one CORESET allocated by the base station device to the terminal in a downlink control channel monitoring occasion;

a first determining module configured to determine at least one group of CORESETs from the configuration information, and detect and receive at most one piece of DCI from each group of CORESETs in the at least one group of CORESETs according to a specific DCI format expected by the terminal when the configuration information includes the CORESET group information; and the first determining module is configured to determine at least one group of PDCCH candidates from the configuration information, and detect and receive at most one piece of DCI from each group of PDCCH candidates in the at least one group of PDCCH candidates according to the specific DCI format expected by the terminal when the configuration information includes the PDCCH candidate group information in the at least one CORESET.

Optionally, each group of CORESETs includes at least one CORESET.

Optionally, each group of PDCCH candidates includes at least one PDCCH candidate.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering and then grouping all the PDCCH candidates in each CORESET according to a preset grouping rule.

Based on the same inventive concept, the embodiments of the present disclosure provide a base station device. For the specific implementation of the downlink control channel transmitting method of the base station device, refer to the description in the method embodiments, and no detailed description is repeated here. The base station device mainly includes:

a sending module configured to send configuration information to a terminal, wherein the configuration information includes control resource set (CORESET) group information or PDCCH candidate group information in at least one CORESET allocated by the base station device to the terminal during a downlink control channel monitoring occasion;

thus when the configuration information includes the CORESET group information, the terminal can determine at least one group of CORESETs from the configuration information, and can detect and receive at most one piece of DCI from each group of CORESETs in the at least one group of CORESETs according to a specific DCI format expected by the terminal; and when the configuration information includes the PDCCH candidate group information in the at least one CORESET, the terminal can determine at least one group of PDCCH candidates from the configuration information, and can detect and receive at most one piece of DCI from each group of PDCCH candidates in the at least one group of PDCCH candidates according to the specific DCI format expected by the terminal.

Optionally, when each group of CORESETs includes at least one CORESET, the base station device includes:

a first sending submodule configured to send at most one piece of DCI in each group of CORESETs in a monitoring occasion according to a specific DCI format.

Optionally, when each group of CORESETs includes multiple CORESETs, the base station device includes:

a configuration module configured to independently deploy configuration parameters of the multiple CORESETs or uniformly deploy configuration parameters of the multiple CORESETs.

Optionally, when each group of PDCCH candidates includes at least one PDCCH candidate, the base station device includes:

a second sending submodule configured to send at most one piece of DCI in each group of PDCCH candidates in a monitoring occasion according to a specific DCI format.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering and then grouping all the PDCCH candidates in each CORESET according to a preset grouping rule.

Based on the same inventive concept, the embodiments of the present disclosure provide a terminal. For specific implementation of the method for transmitting a downlink control channel of the terminal, refer to the foregoing description of the embodiments of the above method, and no detailed description is repeated here. The terminal mainly includes a processor and a memory, wherein a preset program is stored in the memory. The processor reads the program in the memory, and the following processes are executed according to the program:

the terminal receives configuration information sent by a base station device, wherein the configuration information includes control resource set (CORESET) group information or PDCCH candidate group information in at least one CORESET allocated by the base station device to the terminal in a downlink control channel monitoring occasion;

when the configuration information includes the CORESET group information, the terminal determines at least one group of CORESETs from the configuration information, and detects and receives at most one piece of DCI from each group of CORESETs of the at least one group of CORESETs according to a specific DCI format expected by the terminal; and when the configuration information includes PDCCH candidate group information in the at least one CORESET, the terminal determines at least one group of PDCCH candidates from the configuration information, and detects and receives at most one piece of DCI from each group of PDCCH candidates in the at least one group of PDCCH candidates according to the specific DCI format expected by the terminal.

Based on the same inventive concept, the embodiments of the present disclosure provide a base station device. For specific implementation of the method for transmitting a downlink control channel of the terminal, refer to the foregoing description of the embodiments of the above method, and no detailed description is repeated here. The base station device includes a processor and a memory, wherein a preset program is stored in the memory, and the processor reads the program in the memory and executes the following processes according to the program:

the base station device sends configuration information to a terminal, wherein the configuration information includes control resource set (CORESET) group information or PDCCH candidate group information in at least one CORESET allocated by the base station device to the terminal in a downlink control channel monitoring occasion;

thus when the configuration information includes the CORESET group information, the terminal can determine at least one group of CORESETs from the configuration information, and can detect and receive at most one piece of DCI from each group of CORESETs in the at least one group of CORESETs according to a specific DCI format expected by the terminal; and when the configuration information includes the PDCCH candidate group information in the at least one CORESET, the terminal can determine at least one group of PDCCH candidates from the configuration information, and can detect and receive at most one piece of DCI from each group of PDCCH candidates in the at least one group of PDCCH candidates according to the specific DCI format expected by the terminal.

Figure 3:
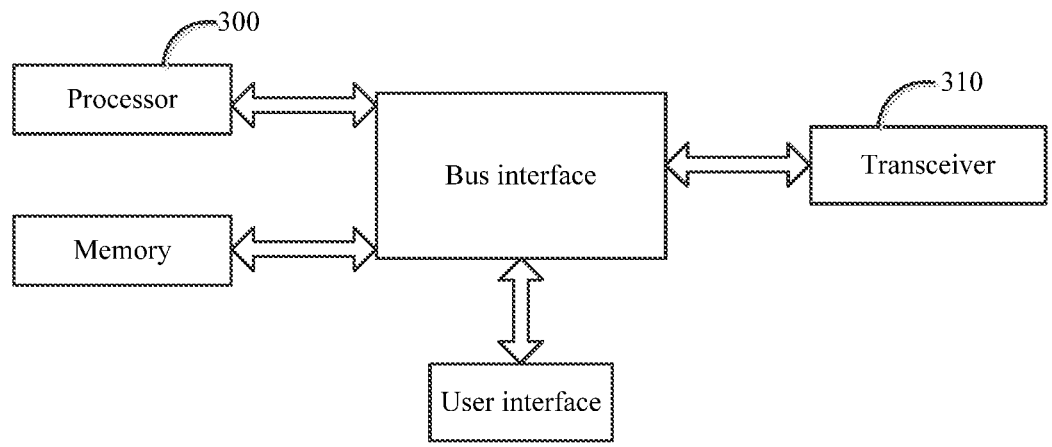
FIG. 3 is a solid schematic diagram of a terminal according to embodiments of the present disclosure.

Referring to FIG. 3, the embodiments of the present disclosure provide a terminal based on the same inventive concept, the terminal at least includes a processor 300 and a transceiver 310, wherein, the processor 300 is configured to read a program in a memory, and execute the following processes through the transceiver 310:

receiving configuration information sent by a base station device, wherein the configuration information includes control resource set (CORESET) group information or PDCCH candidate group information in at least one CORESET allocated by the base station device to the terminal in a downlink control channel monitoring occasion;

determining at least one group of CORESETs from the configuration information, and detecting and receiving at most one piece of DCI from each group of CORESETs in the at least one group of CORESETs according to a specific DCI format expected by the terminal when the configuration information includes the CORESET group information; and determining at least one group of PDCCH candidates from the configuration information, and detecting and receiving at most one piece of DCI from each group of PDCCH candidates in the at least one group of PDCCH candidates according to the specific DCI format expected by the terminal when the configuration information includes the PDCCH candidate group information in the at least one CORESET.

The transceiver 310 is configured to receive and send data under control of the processor 300.

As shown in FIG. 3, a bus architecture may include any number of interconnected buses and bridges and is specifically formed by connecting various circuits of one or more processors represented by the processor 300 and memories represented by the memory. The bus architecture may also be formed by connecting various other circuits such as peripheral equipment, voltage regulators and power management circuits, which are well known in the art and not further described herein. The bus interface provides an interface. The transceiver 310 may be multiple elements, namely a transmitter and a receiver, and provides a communication unit with various other devices over a transmission medium. For different user devices, user interfaces may also be interfaces capable of connecting required devices externally or internally. The connected devices include, but are not limited to, a keypad, a display, a speaker, a microphone and a joystick.

The processor 300 is in charge of managing the bus architecture and general processing, and the memory may store data used by the processor 300 during operation performing.

Optionally, each group of CORESETs includes at least one CORESET.

Optionally, each group of PDCCH candidates includes at least one PDCCH candidate.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering and then grouping all the PDCCH candidates in each CORESET according to a preset grouping rule.

Figure 4:
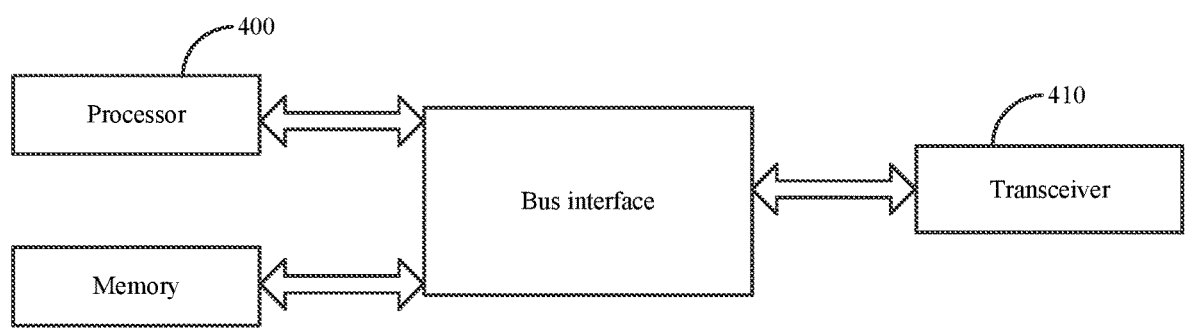
FIG. 4 is a solid schematic diagram of a base station according to embodiments of the present disclosure.

Referring to FIG. 4, the embodiments of the present disclosure provide a base station device based on the same inventive concept, the base station device includes at least a processor 400 and a transceiver 410, wherein, the processor 400 is configured to read a program in a memory, and execute the following processes through the transceiver 410:

sending configuration information to a terminal, wherein the configuration information includes control resource set (CORESET) group information or PDCCH candidate group information in at least one CORESET allocated by the base station device to the terminal in a downlink control channel monitoring occasion;

thus when the configuration information includes the CORESET group information, the terminal can determine at least one group of CORESETs from the configuration information, and can detect and receive at most one piece of DCI from each group of CORESETs in the at least one group of CORESETs according to a specific DCI format expected by the terminal; and when the configuration information includes the PDCCH candidate group information in the at least one CORESET, the terminal can determine at least one group of PDCCH candidates from the configuration information, and can detect and receive at most one piece of DCI from each group of PDCCH candidates in the at least one group of PDCCH candidates according to the specific DCI format expected by the terminal.

The transceiver 410 is configured to receive and send data under control of the processor.

As shown in FIG. 4, a bus architecture may include any number of interconnected buses and bridges and is specifically formed by connecting various circuits of one or more processors represented by the processor 400 and memories represented by the memory. The bus architecture may also be formed by connecting various other circuits such as peripheral equipment, voltage regulators and power management circuits, which are well known in the art and not further described herein. A bus interface provides an interface. The transceiver 410 may be multiple elements, namely a transmitter and a receiver, and provides a communication unit with various other devices over a transmission medium. The processor 400 is in charge of managing the bus architecture and general processing, and the memory may store data used by the processor 400 during operation performing.

Optionally, when each group of CORESETs includes at least one CORESET, the processor 400 is configured to:

send at most one piece of DCI according to a specific DCI format in each group of CORESETs in a monitoring occasion through the transceiver 410.

Optionally, when each group of CORESETs includes multiple CORESETs, the processor 400 is configured to:

independently deploy configuration parameters of the multiple CORESETs or uniformly deploy configuration parameters of the multiple CORESETs.

Optionally, when each group of PDCCH candidates includes at least one PDCCH candidate, the processor 400 is configured to:

send at most one piece of DCI in each monitoring group of the PDCCH candidates according to a specific DCI format through the transceiver 410.

Optionally, when each CORESET in the at least one CORESET includes multiple groups of PDCCH candidates, the multiple groups of PDCCH candidates are obtained by grouping according to an aggregation level A1.

Optionally, when each CORESET in the at least one CORESET includes multiple groups of PDCCH candidates, the multiple groups of PDCCH candidates of each CORESET are obtained by numbering and then grouping all the PDCCH candidates in each CORESET according to a preset grouping rule.

Those skilled in the art should understand that the embodiments of the present disclosure may be provided as a method, a system or a computer program product. Therefore, the present disclosure may take the form of a complete hardware embodiment, a complete software embodiment, or an embodiment combining software and hardware aspects. Moreover, the present disclosure may take the form of a computer program product implemented on one or more computer-usable storage media (comprising, but not limited to, a disk memory, a CD-ROM and an optical memory) containing computer-usable program codes.

The present disclosure is described with reference to flow diagrams and/or block diagrams of methods, devices (systems) and computer program products according to the embodiments of the present disclosure. It should be understood that each process and/or block in the flow diagrams and/or block diagrams, and combinations of processes and/or or blocks in the flow diagrams and/or block diagrams can be implemented by computer program instructions. The computer program instructions may be provided for a processor of a general-purpose computer, a special-purpose computer, an embedded processor or other programmable data processing device to produce a machine, so that the instructions generated by the computer or processors of other programmable data processing devices are used for generating devices for implementing the functions specified in one or more flow diagrams and/or one or more blocks of the block diagrams.

The computer program instructions may also be stored in a computer-readable memory capable of directing a computer or other programmable data processing device to operate in a specific manner such that the instructions stored in the computer-readable memory produce a manufactured article comprising an instruction device, and the instruction device implements the functions specified in one or more flow diagrams and/or one or more blocks of the block diagrams.

The computer program instructions can also be loaded onto a computer or other programmable data processing device so that a series of steps can be performed on the computer or other programmable device to produce a computer-implemented process, and instructions executed on the computer or other programmable device provide steps for implementing the functions specified in one or more flows of the flow diagrams and/or one or more blocks of the block diagrams.

Although the preferred embodiments of the present disclosure have been described, those skilled in the art can make other variations and modifications to these embodiments once they know the basic inventive concepts. Therefore, the appended claims are intended to be construed to include the preferred embodiments and all variations and modifications which fall within the scope of the disclosure.

Obviously, those skilled in the art can make various variations and modifications to the embodiments of the present disclosure without departing from the spirit and scope of the embodiments of the present disclosure. In this way, if these variations and modifications of the embodiments of the present disclosure fall within the scope of the claims of the present disclosure and the equivalent technologies, the present disclosure also intends to include these variations and modifications.

What is claimed is:

1. A method for transmitting a downlink control channel, comprising:

receiving, by a terminal, configuration information sent by a base station, wherein the configuration information comprises PDCCH candidate group information in at least one CORESET allocated by the base station to the terminal in a downlink control channel monitoring occasion;

determining, by the terminal, at least one group of PDCCH candidates from the configuration information, and detecting and receiving, by the terminal, at most one piece of DCI from each group of PDCCH candidates in the at least one group of PDCCH candidates according to the specific DCI format expected by the terminal when the configuration information comprises the PDCCH candidate group information in the at least one CORESET;

wherein each group of PDCCH candidates comprises at least one PDCCH candidate;

wherein when each CORESET in the at least one CORESET comprises multiple groups of PDCCH candidates, the multiple groups of PDCCH candidates are obtained by grouping according to an aggregation level A1; or wherein when each CORESET in the at least one CORESET comprises multiple groups of PDCCH candidates, the multiple groups of PDCCH candidates of each CORESET are obtained by numbering all the PDCCH candidates in each CORESET and grouping numbered PDCCH candidates according to a preset grouping rule.

2. A method for transmitting a downlink control channel, comprising:

sending, by a base station, configuration information to a terminal, wherein the configuration information comprises PDCCH candidate group information in at least one CORESET allocated by the base station to the terminal in a downlink control channel monitoring occasion, so that when the configuration information comprises the PDCCH candidate group information in the at least one CORESET, the terminal determines at least one group of PDCCH candidates from the configuration information, and detects and receives at most one piece of DCI from each group of PDCCH candidates in the at least one group of PDCCH candidates according to the specific DCI format expected by the terminal;

wherein each group of PDCCH candidates comprises at least one PDCCH candidate, and the base station sends at most one piece of DCI in each group of PDCCH candidates in a monitoring occasion according to a specific DCI format;

wherein when each CORESET in the at least one CORESET comprises multiple groups of PDCCH candidates, the multiple groups of PDCCH candidates are obtained by grouping according to an aggregation level A1; or wherein when each CORESET in the at least one CORESET comprises multiple groups of PDCCH candidates, the multiple groups of PDCCH candidates of each CORESET are obtained by numbering all the PDCCH candidates in each CORESET and grouping numbered PDCCH candidates according to a preset grouping rule.

3. A terminal, comprising at least a processor and a transceiver, wherein:

the processor is configured to read a program in a memory and perform following processes through the transceiver:

receiving configuration information sent by a base station, wherein the configuration information comprises PDCCH candidate group information in at least one CORESET allocated by the base station to the terminal in a downlink control channel monitoring occasion;

determining at least one group of PDCCH candidates from the configuration information, and detecting and receiving at most one piece of DCI from each group of PDCCH candidates in the at least one group of PDCCH candidates according to the specific DCI format expected by the terminal when the configuration information comprises the PDCCH candidate group information in the at least one CORESET;

the transceiver is configured to receive and send data under control of the processor;

wherein each group of PDCCH candidates comprises at least one PDCCH candidate;

wherein when each CORESET in the at least one CORESET comprises multiple groups of PDCCH candidates, the multiple groups of PDCCH candidates are obtained by grouping according to an aggregation level A1; or wherein when each CORESET in the at least one CORESET comprises multiple groups of PDCCH candidates, the multiple groups of PDCCH candidates of each CORESET are obtained by numbering all the PDCCH candidates in each CORESET and grouping numbered PDCCH candidates according to a preset grouping rule.

4. A base station, comprising at least a processor and a transceiver, wherein:

the processor is configured to read a program in a memory and perform following processes through the transceiver:

sending configuration information to a terminal, wherein the configuration information comprises PDCCH candidate group information in at least one CORESET allocated by the base station to the terminal in a downlink control channel monitoring occasion, so that when the configuration information comprises the PDCCH candidate group information in the at least one CORESET, the terminal determines at least one group of PDCCH candidates from the configuration information, and detects and receives at most one piece of DCI from each group of PDCCH candidates in the at least one group of PDCCH candidates according to the specific DCI format expected by the terminal;

the transceiver is configured to receive and send data under control of the processor;

wherein when each group of PDCCH candidates comprises at least one PDCCH candidate, the processor is configured to:

send at most one piece of DCI according to a specific DCI format in each group of PDCCH candidates in a monitoring occasion through the transceiver;

wherein when each CORESET in the at least one CORESET comprises multiple groups of PDCCH candidates, the multiple groups of PDCCH candidates are obtained by grouping according to an aggregation level A1; or wherein when each CORESET in the at least one CORESET comprises multiple groups of PDCCH candidates, the multiple groups of PDCCH candidates of each CORESET are obtained by numbering all the PDCCH candidates in each CORESET and grouping numbered PDCCH candidates according to a preset grouping rule.

* * * * *